US008560358B2

(12) United States Patent
Doerfler et al.

(10) Patent No.: US 8,560,358 B2
(45) Date of Patent: *Oct. 15, 2013

(54) COLLABORATIVE ENVIRONMENT TO ASSESS, DESIGN, AND IMPLEMENT PRODUCT CHANGES

(75) Inventors: Andre Doerfler, Mannheim (DE); Arno Mielke, Karlsruhe (DE); Klaus Herter, Leimen (DE); Ulrich Spinola, Weinheim (DE); Christian Fuhlbruegge, Spechbach (DE); Archim Heimann, Muehlhausen (DE); Werner Sottong, Ubstadt Weiher (DE); Steffen Springborn, Edingen-Neckarhausen (DE); Alexander Stefan Adam, Montreal (CA); Thomas Kretz, Muehlhausen (DE); Karlheinz Agsteiner, Wiesloch (DE); Volker Faisst, Ilvesheim (DE); Otfried von Geisau, Sinsheim-Eschelbach (DE); Dieter Krisch, Karlsruhe (DE); Dorothea Martin, Nussloch (DE); Silke Massmann, Heidelberg (DE); Katharina Sorge, Rauenberg (DE)

(73) Assignee: SAP AG, Walldorf (DE)

( * ) Notice: Subject to any disclaimer, the term of this patent is extended or adjusted under 35 U.S.C. 154(b) by 900 days.

This patent is subject to a terminal disclaimer.

(21) Appl. No.: 12/236,280

(22) Filed: Sep. 23, 2008

(65) Prior Publication Data

US 2010/0076797 A1    Mar. 25, 2010

(51) Int. Cl.
*G06Q 10/00*    (2012.01)

(52) U.S. Cl.
USPC .................. 705/7.11; 705/7.13; 705/7.15

(58) Field of Classification Search
USPC .................... 705/7.11, 7.13, 7.15
See application file for complete search history.

(56) References Cited

U.S. PATENT DOCUMENTS

| 7,092,778 | B2* | 8/2006 | Huang et al. ............... 700/105 |
| 7,747,572 | B2* | 6/2010 | Scott et al. ............... 707/636 |
| 7,810,067 | B2* | 10/2010 | Kaelicke et al. ........... 717/102 |
| 2004/0059615 | A1* | 3/2004 | Byrer et al. ............... 705/8 |
| 2005/0010880 | A1* | 1/2005 | Schubert et al. ............ 716/4 |
| 2005/0267771 | A1* | 12/2005 | Biondi et al. ............... 705/1 |
| 2008/0114630 | A1* | 5/2008 | Chang et al. ............... 705/7 |
| 2008/0313110 | A1* | 12/2008 | Kreamer et al. ............ 706/12 |

* cited by examiner

*Primary Examiner* — Mark A Fleischer
(74) *Attorney, Agent, or Firm* — Mintz, Levin, Cohn, Ferris, Glovsky and Popeo, P.C.

(57) ABSTRACT

Generation of an engineering change case is initiated by associating an identified problem for a product with an engineering change case template. The engineering change case can include a plurality of structured folders that can be populated with content characterizing the identified problem as well as proposed solutions to the identified problem with each folder being assignable to one or more users and having associated deliverables for such users. The various users populate the folders with content associated with the deliverables with at least a portion of the deliverables being delegable and requiring completion in a sequential order. Thereafter, generation of the engineering case can be finalized when an indication is received that all deliverables requiring approval have been completed. Otherwise, the engineering change case can be canceled. Related apparatus, systems, techniques and articles are also described.

16 Claims, 3 Drawing Sheets

COLLABORATIVE ENVIRONMENT TO ASSESS, DESIGN, AND IMPLEMENT PRODUCT CHANGES

TECHNICAL FIELD

The subject matter described herein relates to systems and techniques for providing a collaborative environment to assess, design, and implement product changes.

BACKGROUND

Product development and product change are creative processes in which team members of different domains work together and rely on very different sources of information. Business applications are often not aligned with results from engineering systems (e.g., CAD programs, etc.), a variety of office documents, and/or web-based information. Typically, the efforts of the team members are coordinated via regular meetings that include all the stakeholders from the different domains. In addition, the relevant information is stored in heterogeneous systems. These heterogeneous systems result in a lack of transparency between engineering and logistics which can make the process of implementing an engineering change consume significant time and resources.

SUMMARY

In one aspect, generation of an engineering change case can be initiated. An identified problem for a product can be associated with an engineering change case template that includes a plurality of structured folders that can be populated with content characterizing the identified problem as well as proposed solutions to the identified problem. The folders can each be assignable to one or more users and have associated deliverables for such users. The engineering change case can provide a single source of information relating to the identified problem and the proposed solutions. Input can be received from at least a subset of the users populating the folders with content associated with the deliverables with at least a portion of the deliverables being delegable and requiring completion in a sequential order. Thereafter, generation of the engineering change case can be finalized when an indication is received that all deliverables requiring approval have been completed. Alternatively, the engineering change case can be finalized when only a portion of the deliverables have been completed or the engineering change case can be canceled.

The engineering change case template define a structure of a plurality of structure items (e.g., folders, etc.). The structure item can define users responsible for approving and/or implementing one or more of the plurality of structured folders. The structure item can also define deadlines for completing tasks associated with one or more of the plurality of structured folders.

The engineering change case uses records and case management technology in order to provide a collaborative tool which allows a large number of remote users to use the system. In some variations, the engineering change case is part of an enterprise portal, while in other variations, the engineering change case can be accessed via the Internet. The engineering change case provides various graphical user interfaces to allow users to add, modify, and delete content populated within the folders and to modify attributes associated with such folders. Content can be introduced through various techniques including dragging and dropping, uploading, and the like.

The engineering change case also allows for tasks for a specified user or group of users associated with the engineering change case to be displayed. Overdue tasks can be displayed (e.g., highlighted), and notices can be sent to users assigned to such tasks that they are overdue. In addition, messages can be sent to users that are assigned tasks when such tasks are first assigned, or in some variations, messages can be sent only when prior required tasks (i.e., condition precedent tasks, etc.) have been completed.

In an interrelated aspect, access to the engineering change case is provided to a plurality of users via one or more computer networks. First user-generated input is received that identifies a problem for a product which results in the initiation of an engineering change case. Second user-generated input is received that associates the problem for the product with a historical engineering change case. The historical engineering change case can include a business folder. The business folder in turn can include a plurality of hierarchical folders which include structure items that define a structure of the hierarchical folder and allow user-generated content and attributes to be added to the hierarchical folder. Subsequently, a plurality of user-generated input is received until required tasks associated with each required hierarchical folder are indicated as being complete. In some variations, a first subset of the tasks can only be completed after a second subset of the tasks has been completed. Generation of the engineering case is finalized when an indication is received that all the required tasks have been completed. Alternatively, the engineering change case can be finalized when only a portion of the deliverables have been completed or the engineering change case can be canceled.

In another interrelated aspect, generation of an engineering change case is initiated by associating an identified problem for a product with an engineering change case template. The engineering change case includes a plurality of structured folders that can be populated with content characterizing the identified problem as well as proposed solutions to the identified problem. The folders each have attributes identifying a responsible employee for the folder, a processing status for the folder, and a deadline for processing the folder. Input is received via the collaborative records and case management system from at least a subset of the users populating the folders with content associated with the deliverables. The engineering change case can be finalized when the processing status attributes in the folders indicate all deliverables have been completed. Alternatively, the engineering change case can be finalized when only a portion of the deliverables have been completed or the engineering change case can be canceled.

In still a further interrelated aspect, a product lifecycle management case is initiated. The product lifecycle management comprises a plurality of structured folders that can be populated with content for assessing, designing, and implementing a product. Such folders are assignable to one or more users and having associated deliverables for such users. The product lifecycle management case provides a single source of information relating to the assessment, design, and implementation of the product. Input can be received from at least a subset of the users populating the folders with content associated with the deliverables with at least a portion of the deliverables being delegable and requiring completion in a sequential order. Thereafter, generation of the product lifecycle management case can be finalized when an indication is received that all deliverables requiring approval have been completed, otherwise, the product lifecycle management case can be canceled.

Articles are also described that comprise a tangible machine-readable storage medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. The engineering change case provides a single source of information relating to an identified engineering problem and proposed solutions. Users may modify and update proposed solutions and can readily check the status of the engineering change case at various granularity levels ranging from individual users, to groups of users, to phases of the engineering change case and the like.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
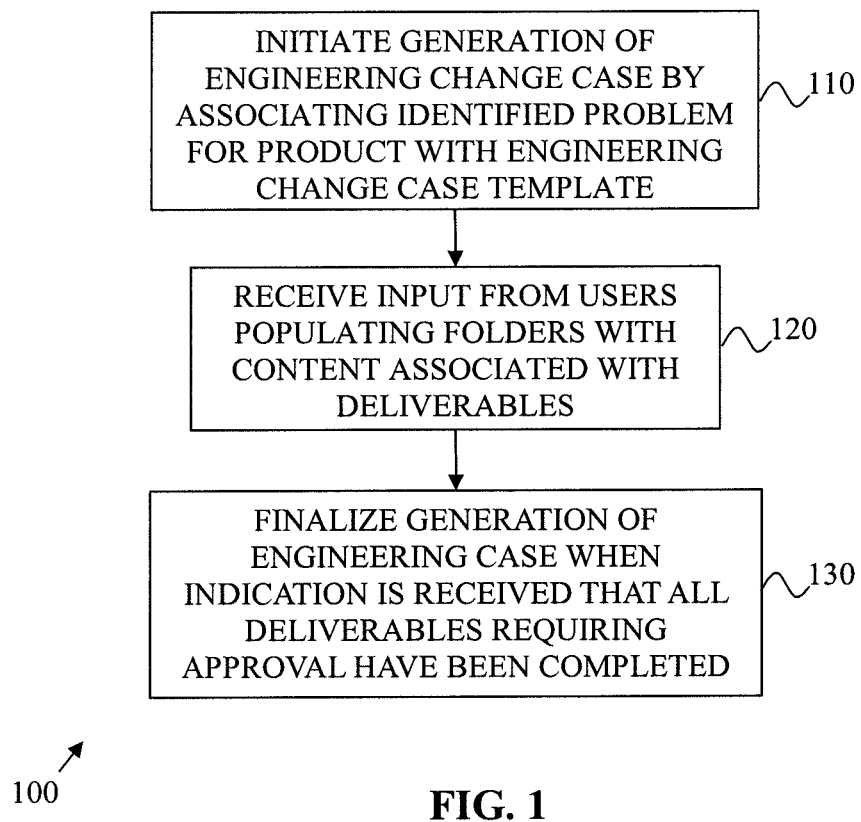
FIG. 1 is a process flow diagram illustrating the generation of an engineering change case.

FIG. 1 is a process flow diagram illustrating a method 100, in which, at 110, generation of an engineering change case using a records and case management system is initiated by associating an identified problem for a product with an engineering change case template. The engineering change case comprises a plurality of structured folders that can be populated with content characterizing the identified problem as well as proposed solutions to the identified problem. The folders can each be assigned to one or more users and have associated deliverables for such users. Input is received, at 120, from at least a subset of the users populating the folders with content associated with the deliverables. At least a portion of the deliverables can be delegated and/or require completion in a sequential order. Generation of the engineering case can be finalized, at 130, when an indication is received that all deliverables requiring approval have been completed. Alternatively, the engineering change case can be finalized when only a portion of the deliverables have been completed or the engineering change case can be canceled.

The main objectives of an engineering change case can include the (i) creation, collection, and structuring of all relevant information ("content"); and (ii) planning, structuring, and executing the work that has to be done in the course of the change process ("tasks"). In practice, content and work are not two independent dimensions. In fact, content can rather be regarded as one of the four aspects that are needed to characterize a work task:

What has to be done?→Referring to content (e.g. describe the problem, identify the affected products, analyze the impact of a design change, etc.)
When? (planned end date or duration)
Who is responsible?
Status of the task? (new, started, completed)

The engineering change case as described herein provides an integration of work and content structuring. This can be achieved by providing for each item in a business folder structure (i.e., engineering change case content structure) the optional attributes:

Responsible employee;
Processing status (not started, started, completed);
Deadline.

The structure thus simultaneously serves to organize the content and the work. In areas within the structure where either the task character of a structure item is predominant or the pure information character, task-related attributes can remain unused.

Figure 2:
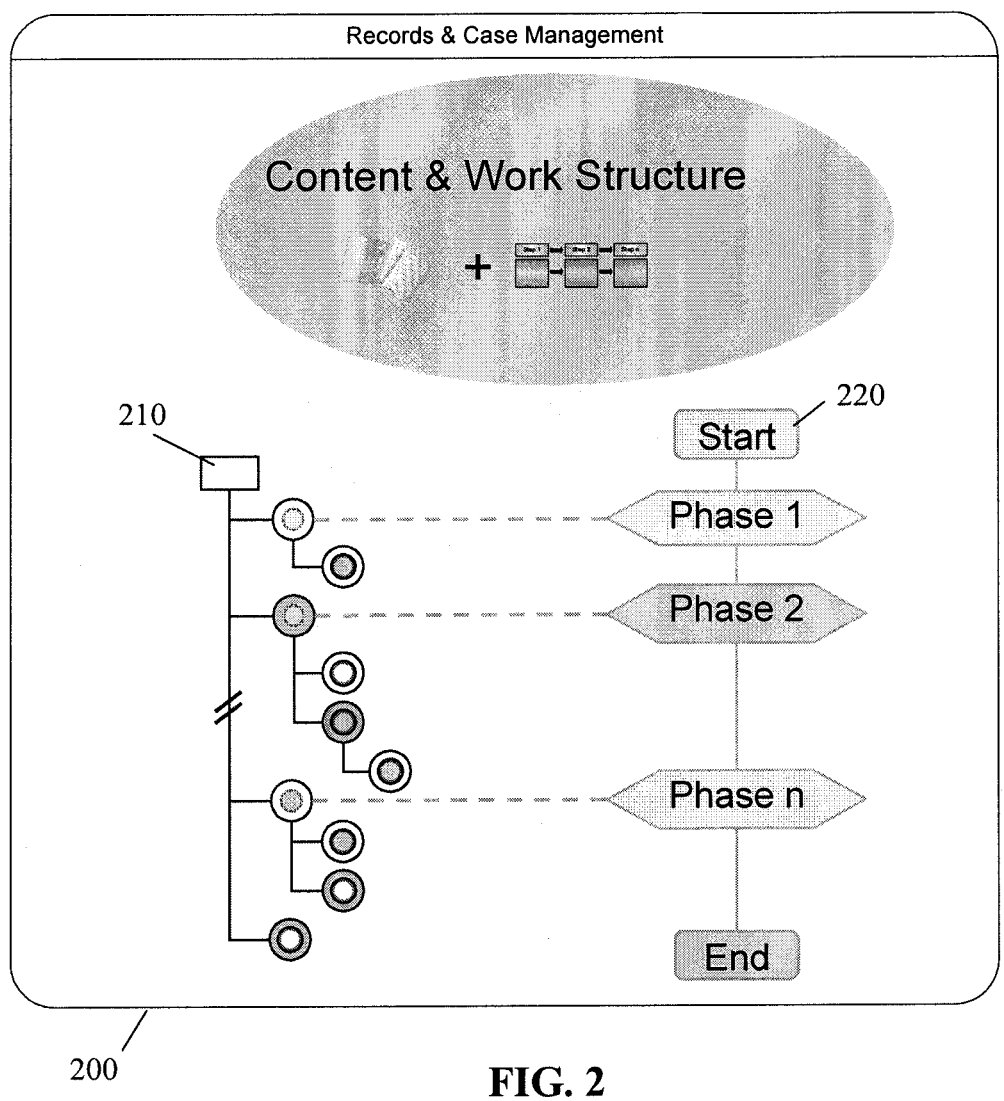
FIG. 2 is a diagram illustrating a relationship between content and work structure.

FIG. 2 is a diagram generally illustrating functionality an engineering change case 200 that is implemented using record and case management technology. The engineering change case 200 provides a plurality of hierarchical business folders 210 that correspond to multiple phases of a product change (or product lifecycle management as described below), which may be processed sequentially, in parallel, or a combination. Advancement from one phase to another may be automatic once hierarchical folders within the business folder are populated with required content or an attribute associated with such hierarchical folder indicates that the processing status is finalized, or it may be contingent on one or more individuals approving the content within such hierarchical folders (which could also result in the processing status indicating that the hierarchical folder has been finalized).

"Engineering change case" refers to collection of documents, references, and decisions used to identify a potential solution to problems that initiate an engineering change; to research, design, and validate engineering change alternatives; and to review and decide on the implementation of the change. The engineering change case contains the responsible person for and overall status of the engineering change. The engineering change case can also identify relevant deadlines for tasks associated with business folders/hierarchical folders.

"Records and case management" refers to the management and processing of records and cases of any kind within a given business context. Records and case management makes it possible to group and structure different forms of information according to business requirements. A records and case management system is one or more software applications that implement such functionality. In some implementations, the records and case management system is a collaborative suite of software applications accessible by a portal or via the web. Content can be added and deleted from corresponding hierarchical folders via various mechanisms including drag and drop, uploading, and the like. In addition, relevant information can be displayed on a single user basis or on a team basis relating to an engineering change case such as processing status of tasks and the like.

A "business folder" refers to a folder for collecting and organizing information relating to a topic according to business requirements. A business folder can contain a plurality of hierarchical folders.

Figure 3:
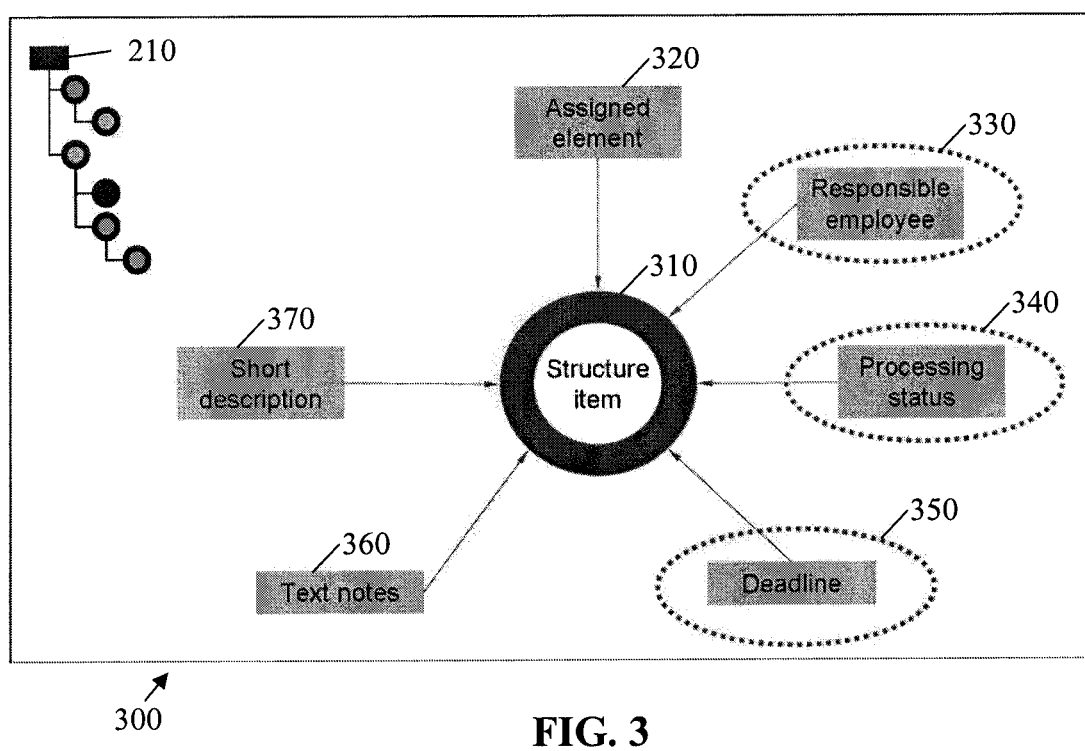
FIG. 3 is a diagram illustrating a business folder and a structure item.

FIG. 3 is a diagram 300 illustrating a structure of a business folder 210 as illustrated in FIG. 2. A business folder 210 includes a structure item 310 that defines the structure of the business folder 210. The structure item 310 can define various attributes including an assigned element 320, a responsible employee 330, a processing status 340, a deadline 350, text notes 360, and/or a short description 370. In some cases, the attributes are not modified and as a default, are empty. In some cases, assignment element 320 can refer to a task or tasks associated with the business folder, a responsible employee 330 can refer to an individual to which the tasks associated with the business folder have been assigned (and/or an individual that is responsible for ultimately approving content within the business folder 210), processing status 340 can refer to a current status of content within the business folder 210 such as how far the task has progressed, who is working on the task (in cases where there may be multiple people handling the same task), deadline 350 can refer to the deadline for completing the corresponding task, text notes 260 can refer to various annotations that can be added for various purposes in a collaborative environment, and short description 370 can refer to a short text summary of the corresponding task.

A user can quickly view and access engineering change cases in which they are currently involved including:

Assignment to at least one structure item that is not "completed"; and

Assignment to the engineering change case header.

Users can also be provided with access to historical engineering change cases in which they were involved over a specified time period.

When a user selects a case from his or her "my work" list, the items in the structure that he is assigned can be highlighted and the structure can be expanded when necessary. For team leads/managers/case responsibles there can be a list that shows cases assigned to employees under their supervision as well as relevant due dates for such cases. Employees can also be provided with a similar view for engineering change cases in which they are involved.

In some implementations, a "spin-off" process can be initiated from within a case. These processes can have various characteristics and requirements. For example, the spin-off process can be supplementary to the main process of the engineering change case that is defined and executed using the content and work structure. They can belong to the engineering change case, but are not necessarily part of the content and work structure. A spin-off process can operate on a "work package", that is, a (flat) list of items of the content and work structure, selected for the specific process (i.e., the work package is a part of the process). Work package content can be changed during the process depending on the spin-off process. There can be different types of processes with each type representing specific business semantics resulting in specific data and functionality (e.g., approvals for case-specific requests, approvals for objects that are relevant within the case (for example release of Engineering Change Order), multi-step workflows such as finding a new supplier for a certain part, triggering processes in other domains, an architecture that allows process types to be developed and added over time, etc.).

Specific spin-off process can include:

Approval processing which can combine a description of the subject that needs to be approved, the list of involved structure items and the list of approvers who need to sign off the approval subject;

Quality inspection processing which can combine parts/structure items to be inspected as samples or standard parts;

Purchasing processing which can combines parts/structure items to be purchased or parts that are the subject of RFI or RFQ processing and related supplier information for the given set of structure items; and Design collaboration which can enable alignment with a development partner so that all information/structure items relevant for a partner outside the engineering change case core team can be collected. For example, information/structure items to be completed or updated by the partner and/or information/structure items that a partner should create/deliver can be collected.

In some variations, access to certain documents contained within business folders may be limited based on categories of users. The following is a sample of such categories:

Private: every member of the engineering change case team can have private documents anywhere in the engineering change case that no other members can access;

Engineering change case Team (default): there can be an engineering change case core team. This team is maintained when the engineering change case is created. By default, the engineering change case team has read/write access to freshly added engineering change case content;

Extended Team: Every member of the company can be given explicit read/write access to one or a number of documents; and Company: One global switch per engineering change case controls if everybody else has read access to the whole engineering change case or no access to it. Every engineering change case team member can set this switch.

In addition, in certain circumstances, a first user can delegate his or her tasks/rights to another user. For example, if somebody has write access to a certain document, such rights can be passed on to others. Such an arrangement can allow, for example, a user tasked with specifying an engineering alternative to a certain component within a system to delegate such task to another user. In some variations, the responsible employee 330 information might be static, while in other variations, the responsible employee 330 would be updated to reflect this delegation. Alternatively, the delegation could be reflected in the text notes 360 or in other attributes associated with the business folder 210.

The following is a multi-phased example that illustrates variations that can be implemented for the current subject matter.

Phase 1—Identification of Potential for Change

Marc Spencer (Spencer Doors Ltd.) sends an email describing an issue with the anti trap feature of the windows-lifter. The email contains two attachments, a word document and a CAD file that figures out the possible issue.

Keren Cley (Change Responsible) checks whether the described issue occurred before at Brown Lifter Ltd. She finds a similar case and copies this case to a new Engineering Change Case.

The copied case contains a prepared structure folder (e.g., one or more business folders). Keren Cley (Change Responsible) rearranges the content as follows to meet the new requirements . . .

Content Template (1) Affected Customers (Folder).

(2) Affected Products (Folder).

(3) Identification of Potential for Change (Folder).

(4) Preliminary Analysis (Folder).

(5) Development of Alternative Solutions (Folder).

(6) Review & Commenting of Change (Folder).

(6.1) Internal Review (Folder).

(6.2) External Review (Folder).

(6.3) Risk Management (Folder).

(7) Decision of Change (Approval Request).

Changes ( . . . ) Risk Management (Folder).

→Folder is deleted ( . . . ) Decision of Change (Approval Request).

→Engineering task remains in the case, but former content of approval request is removed.

New Content (1) Affected Customers (Folder).

(2) Affected Products (Folder).

(3) Identification of Potential for Change (Folder).

(4) Preliminary Analysis (Folder).
(5) Development of Alternative Solutions (Folder).
(6) Review & Commenting of Change (Folder).
    (6.1) Internal Review (Folder).
    (6.2) External Review (Folder).
(7) Decision of Change (Approval Request)

By default, Keren Cley (Change Responsible) is responsible for all folders in the case as long as no other person is assigned as the new responsible.

Keren Cley (Change Responsible) describes all her expectations and the expected deliverables of each folder. This includes the initial problem description and the customer documents. She adds Marc Spencer (Spencer Doors Ltd.) to the "Affected Customer" folder.

Keren Cley (Change Responsible) defines the change team and adds the members at the root level of the case. Only the change team members have access to this new case.

Change Team members are
    Paul Hedger as Chief Engineer;
    Jim Clark as Technical Analyst.

Phase 2—Preliminary Analysis

Keren Cley (Change Responsible) assigns the folder "Preliminary Analysis" to Jim Clark (Technical Analyst) and defines the deliverables:

Deliverables of folder "Preliminary Analysis":
    Conduct a technical analysis to verify the customers issue with our window-lifter product;
    List all verified issues and not verified issues;
    Identify all affected parts of the own window-lifter product;
    Check whether the product is used by other customers;

Jim Clark (Technical Analyst) runs the preliminary analysis of this issue and collects all deliverables except affected products in the content under the folder "Preliminary Analysis" (insert an Excel file). He adds all affected products of the window-lifter product to the folder "Affected Products". He adds the customer Jacob Harvey (Harvey Doors Ltd.) to the "Affected Customer" folder.

Jim Clark (Technical Analyst) confirms the folder "Preliminary Analysis" he is responsible for when finished.

Keren Cley (Change Responsible) is notified and checks the deliverables. Because of the current results of the analysis she decides to request a check of possible legal impacts. Therefore she assigns the task "Check legal impacts" to Jim Clark (Technical Analyst).

Jim Clark (Technical Analyst) checks if there are any legal impacts and adds his evaluation results to the new subfolder "Legal Aspects" of folder "Preliminary Analysis".

Jim Clark (Technical Analyst) confirms his tasks "Check legal impacts" when finished.

Phase 3—Development of Alternative Solutions

Keren Cley (Change Responsible) assigns the folder "Development of Alternative Solutions" to Jim Clark (Technical Analyst) and defines the deliverables:

Deliverables of folder "Development of Alternative Solutions":
    Find at least two possible solution alternatives;
    Describe each alternative textually and provide a redlined CAD drawing that figures out all changes.

Jim Clark (Technical Analyst) develops 2 potential solution alternatives:
    Solution A: "Window-lifter Power Limiter";
    Solution B: "Barrier Detector".

For each solution Jim:
    Creates a new product master as copy of the original product master;
    Prepares CAD drawings.

Jim Clark (Technical Analyst) adds each solution paper including the CAD files to a separate new subfolder of folder "Development of Alternative Solutions".

Jim Clark (Technical Analyst) confirms the folder "Development of Alternative Solutions" he is responsible for when finished.

Phase 4—Review & Commenting of Change

Keren Cley (Change Responsible) notifies all change team members to revise and to comment the solution alternatives A "Window-lifter Power Limiter" and B "Barrier Detector". She prepares a new content folder "Comments of Change Team" in folder "Internal Review".

Jim Clark (Technical Analyst), Paul Hedger (Chief Engineer), and Keren Cley (Change Responsible) add their comments as simple notes to this new folder "Comments of Change" Team.

Keren Cley (Change Responsible) recommends a cost analysis to ensure that the overall costs are below 15000€ and assigns this tasks "Cost Analysis" to Jim Clark (Technical Analyst). The task describes all deliverables including the cost limit to be checked via this task.

Paul Hedger (Chief Engineer) recommends in his note to make a standardization compatibility check.

Keren Cley (Change Responsible) therefore assigns the tasks "Check Standardization Compatibility" to Jim Clark (Technical Analyst).

Jim Clark (Technical Analyst) makes a cost analysis and adds his results that confirm that the cost limit is kept to a separate new subfolder "Cost Analysis" of folder "Review & Commenting of Change".

Jim Clark (Technical Analyst) checks the standardization compatibility and adds his results to a separate new subfolder "Standardization" of folder "Review & Commenting of Change".

Jim Clark (Technical Analyst) confirms his tasks "Cost Analysis" and "Check Standardization Compatibility" when finished.

Keren Cley (Change Responsible) confirms the folder "Review & Commenting of Change" she is responsible for when finished.

Phase 5—Decision of Change

Keren Cley (Change Responsible) assigns the approval request "Decision of Change" to Paul Hedger (Chief Engineer).

Paul Hedger (Chief Engineer) verifies the solutions proposals including all collected data and decides for solution A "Window-lifter Power Limiter" because of lower costs and the technical feasibility. He comments his decision accordingly at the approval request.

Paul Hedger (Chief Engineer) confirms his approval request "Decision of Change" when finished.

Keren Cley (Change Responsible) notifies Marc Spencer (Spencer Doors Ltd.) about the upcoming changes in the window-lifter product of Brown Lifter Ltd.

Keren Cley (Change Responsible) notifies Jacob Harvey (Harvey Doors Ltd.) about the decision because he is also affected by this change.

Marc Spencer (Spencer Doors Ltd.) agrees with the proposed solution.

Jacob Harvey (Harvey Doors Ltd.) also agrees with the proposed solution.

Keren Cley (Change Responsible) adds their approval E-Mails the new subfolder "Customer Approval" of folder "External Review".

Phase 6—Implementation of Change

Keren Cley (Change Responsible) assigns the folder "Implementation of Change" to Jim Clark.

Jim Clark creates an engineering change order and changes the bill of materials, the product and its bill of material and releases the enterprise core object.

Jim adds the enterprise core object, the bill of materials, the product, and the bill of material to the folder "Implementation of Change".

Jim Clark sets the folder "Implementation of Change" to finished.

Keren Cley gets a notification that the folder "Implementation of Change" is finished.

Keren Cley sets the overall processing status to "Finished".

Keren Cley (Change Responsible) exits the Engineering Change Case.

The current subject matter can also be applied to other multi-phased processes including, for example, product life-cycle management (PLM). PLM includes product life-cycle phases that begin with requirements and initial product ideas, then proceeds to a design phase which is followed by an implementation phase. These phases can be implemented in a PLM change case that can correspond to the phases illustrated in FIG. 2, with each of the phases having a plurality of hierarchical business folders 210. These business folders 210 may be processed sequentially, in parallel, or a combination. Similar to an engineering change case, advancement from one PLM phase to another may be automatic once the business folders are populated with required content or an attribute associated with such business folder indicates that the processing status is finalized, or it may be contingent on one or more individuals approving the content within such business folders (which could also result in the processing status indicating that the business folder has been finalized).

In the PLM requirements phase, various ideas and requirements can be collected and managed, including ratings, priorities, and so on. The consolidation of such information has to result in a well-defined requirement specification object that is handed over to development.

The PLM design phase creates one or more models or concepts and evolves through several changes and improvements. The PLM design phase ends with an assembly structure, which defines all the assemblies of the different domains. These assemblies serve as the handover information to the production master data and should therefore have a similar structure.

In the PLM implementation phase, during which manufacturing master data is defined, information such as the bill of materials, bill of operations, recipes, and the factory layout can be defined, sometimes using different master data for different plants that perform the execution in different ways.

There can be two or more iterations between the different PLM phases. These iterations can be handled with well-defined information (for example, using versions) that passes the gates. For the large number of changes, developments, and minor improvements during the individual phases, a change management service can be provided that handles synchronization and validation.

In the PLM design phase, different domains and partners can be interfaced with a personal work area and team work area. The variety of aspects and interdependencies cannot be handled by simple hierarchy relationships. In this phase, a tagging mechanism can provide greater flexibility for collecting, categorizing, and finding related information. As the information is located in many different types of media, a business folder provides access to all relevant information.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flows depicted in the accompanying figures and described herein do not require the particular order shown, or sequential order, to achieve desirable results. Other embodiments may be within the scope of the following claims.

What is claimed is:

1. An article comprising a non-transitory machine-readable media embodying instructions that when performed by one or more machines result in operations comprising:

initiating an engineering change case by associating an identified problem for a product with an engineering change case template, the engineering change case comprising a plurality of structured folders that can be populated with content characterizing the identified problem as well as proposed solutions to the identified problem, the folders each being assignable to one or more users and having associated deliverables for such users, the folders each having attributes indicating whether the corresponding deliverables have been completed as determined by one or more of the users, the engineering change case providing a single source of information relating to the identified problem and the proposed solutions;

receiving input from at least a subset of the users populating the folders with content associated with the deliverables, at least a portion of the deliverables being delegable and requiring completion in a sequential order; and finalizing generation of the engineering change case when an indication is received that all deliverables requiring approval have been completed;

wherein:

the engineering change case comprises a plurality of phases and each phase is associated with a subset of the structured folders;

the engineering change case comprises a structure item which defines a structure of the plurality of structured folders; and the engineering change case allows users to drag and drop content within the folders.

2. An article as in claim 1, wherein the structure item defines users responsible for approving one or more of the plurality of structured folders.

3. An article as in claim 1, wherein the structure item defines users responsible for implementing tasks associated with one or more of the plurality of structured folders.

4. An article as in claim 1, wherein the structure item defines deadlines for completing tasks associated with one or more of the plurality of structured folders.

5. An article as in claim 1, wherein the machine-readable storage media further embodies instructions that when performed by one or more machines result in operations comprising:

displaying all tasks for a specified user in connection with the engineering change case.

6. An article as in claim 1, wherein the machine-readable storage media further embodies instructions that when performed by one or more machines result in operations comprising:

displaying all overdue tasks in connection with the engineering change case.

7. An article as in claim 1, wherein the machine-readable storage media further embodies instructions that when performed by one or more machines result in operations comprising:

receiving user-generated input identifying each user assigned tasks in connection with the engineering change case.

8. An article as in claim 7, wherein the machine-readable storage media further embodies instructions that when performed by one or more machines result in operations comprising:

sending a message to each identified user characterizing his or her assigned tasks.

9. An article as in claim 8, wherein the messages are sent after prior tasks that are requirements for a future task assigned to the corresponding user have been completed.

10. An article comprising non-transitory machine-readable storage media embodying instructions that when performed by one or more machines result in operations comprising:

initiating a product lifecycle management case, the product lifecycle management comprising a plurality of structured folders that can be populated with content for assessing, designing, and implementing a product, the folders each being assignable to one or more users and having associated deliverables for such users, the folders each having attributes indicating whether the corresponding deliverables have been completed as determined by one or more of the users, the product lifecycle management case providing a single source of information relating to the assessment, design, and implementation of the product;

receiving input from at least a subset of the users populating the folders with content associated with the deliverables, at least a portion of the deliverables being delegable and requiring completion in a sequential order; and finalizing generation of the product lifecycle management case when an indication is received that all deliverables requiring approval have been completed, otherwise, canceling the product lifecycle management case;

wherein the product lifecycle management case comprises a plurality of phases and each phase is associated with a subset of the structured folders;

the product lifecycle management case comprises a structure item which defines a structure of the plurality of structured folders and a plurality of attributes, the plurality of attribute comprising an assignment element referencing at least one task associated with the structured folder, a responsible employee referencing an individual for which tasks associated with the structured folder have been assigned, a processing status referencing a current status of content within the structured folder, a deadline referencing a deadline for completing a corresponding task, text notes comprising user-generated annotations, and a short description comprising text characterizing a corresponding task.

11. A method for implementation by one or more data processors comprising:

initiating, by at least one data processor, an engineering change case by associating an identified problem for a product with an engineering change case template, the engineering change case comprising a plurality of structured folders that can be populated with content characterizing the identified problem as well as proposed solutions to the identified problem, the folders each being assignable to one or more users and having associated deliverables for such users, the folders each having attributes indicating whether the corresponding deliverables have been completed as determined by one or more of the users, the engineering change case providing a single source of information relating to the identified problem and the proposed solutions;

receiving, by at least one data processor, input from at least a subset of the users populating the folders with content associated with the deliverables, at least a portion of the deliverables being delegable and requiring completion in a sequential order; and finalizing, by at least one data processor, generation of the engineering change case when an indication is received that all deliverables requiring approval have been completed;

wherein:

the engineering change case comprises a plurality of phases and each phase is associated with a subset of the structured folders;

the engineering change case comprises a structure item which defines a structure of the plurality of structured folders; and the engineering change case allows users to drag and drop content within the folders.

12. A method as in claim 11, wherein the structure item defines one or more of:

users responsible for approving one or more of the plurality of structured folders, users responsible for implementing tasks associated with one or more of the plurality of structured folders, and deadlines for completing tasks associated with one or more of the plurality of structured folders.

13. A method as in claim 11 further comprising:

displaying, by at least one data processor, all tasks for a specified user in connection with the engineering change case.

14. A method as in claim 11 further comprising:

displaying, by at least one data processor, all overdue tasks in connection with the engineering change case.

15. A method as in claim 11 further comprising:

receiving, by at least one data processor, user-generated input identifying each user assigned tasks in connection with the engineering change case.

16. A method as in claim 15 further comprising:

sending, by at least one data processor, a message to each identified user characterizing his or her assigned tasks;

wherein the messages are sent after prior tasks that are requirements for a future task assigned to the corresponding user have been completed.

* * * * *